(12) United States Patent
Yasui et al.

(10) Patent No.: US 8,707,211 B2
(45) Date of Patent: Apr. 22, 2014

(54) RADIAL GRAPHICAL USER INTERFACE

(75) Inventors: Nozomu Yasui, Taipei (TW); Ko-Kuang Liu, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/278,593

(22) Filed: Oct. 21, 2011

(65) Prior Publication Data
US 2013/0104079 A1 Apr. 25, 2013

(51) Int. Cl.
*G06F 3/048* (2013.01)
(52) U.S. Cl.
USPC .......................................................... 715/834
(58) Field of Classification Search
CPC .................................................... G06F 3/0482
USPC .......................................................... 715/834
See application file for complete search history.

(56) References Cited

U.S. PATENT DOCUMENTS

| | | | |
|---|---|---|---|
| 5,745,717 A * | 4/1998 | Vayda et al. | 715/834 |
| 6,918,091 B2 * | 7/2005 | Leavitt et al. | 715/765 |
| 7,036,090 B1 * | 4/2006 | Nguyen | 715/834 |
| 7,036,091 B1 * | 4/2006 | Nguyen | 715/834 |
| 7,509,348 B2 * | 3/2009 | Burtner et al. | 1/1 |
| 7,895,530 B2 * | 2/2011 | Leavitt et al. | 715/810 |
| 8,005,506 B2 * | 8/2011 | Choi et al. | 455/556.1 |
| 8,280,536 B1 * | 10/2012 | Fadell et al. | 700/83 |
| 2004/0221243 A1 * | 11/2004 | Twerdahl et al. | 715/834 |
| 2004/0250217 A1 * | 12/2004 | Tojo et al. | 715/810 |
| 2005/0278647 A1 * | 12/2005 | Leavitt et al. | 715/765 |
| 2006/0085763 A1 * | 4/2006 | Leavitt et al. | 715/810 |
| 2007/0079258 A1 * | 4/2007 | Hsieh et al. | 715/853 |
| 2007/0094597 A1 * | 4/2007 | Rostom | 715/700 |
| 2007/0271528 A1 * | 11/2007 | Park et al. | 715/810 |
| 2008/0171572 A1 * | 7/2008 | Choi et al. | 455/556.1 |
| 2009/0327964 A1 * | 12/2009 | Mouilleseaux et al. | 715/834 |
| 2010/0281430 A1 | 11/2010 | Safar | |
| 2010/0299637 A1 * | 11/2010 | Chmielewski et al. | 715/834 |
| 2010/0333030 A1 | 12/2010 | Johns | |
| 2011/0055760 A1 | 3/2011 | Drayton et al. | |
| 2011/0066981 A1 * | 3/2011 | Chmielewski et al. | 715/834 |
| 2011/0145756 A1 * | 6/2011 | Hama et al. | 715/784 |
| 2012/0203379 A1 * | 8/2012 | Sloo et al. | 700/276 |
| 2012/0278762 A1 * | 11/2012 | Mouilleseaux et al. | 715/834 |

OTHER PUBLICATIONS

Unknown., "Fittsmenu, Menu Radial Para Gnome (Experimental)," Video retrieved from http://www.youtube.com/watch?v=tumQ-FAlkAc&feature=related, Uploaded on Aug. 10, 2007.
Unknown., "Android Circle Launcher Widget for Shortcuts on My Nexus S," Video retrieved from http://www.youtube.com/watch?v=K7I2ZhVS2u8, Uploaded on Jan. 15, 2011.
Berlin, D., "Radian—Radial Launcher," Video retrieved from http://vimeo.com/7631175, Published: Nov. 15, 2009.

* cited by examiner

*Primary Examiner* — William Bashore
*Assistant Examiner* — Henry Orr

(57) ABSTRACT

Systems, methods, and machine-readable and executable instructions are provided for displaying a radial graphical user interface. The radial graphical user interface can include displaying a first layer radial menu item as a circular shape and displaying a second layer radial menu of a number of first menu sub-items related to the first layer menu item grouped concentrically around the first layer radial menu in response to a user selecting the first menu item. The graphical user interface can also include replacing the first layer menu with a user selected first menu sub-item and replacing the second layer radial menu with a number of second menu sub-items related to the selected first menu sub-item in response to a user selecting one of the number of first menu sub-items, wherein the second layer is rotatable by a user.

13 Claims, 6 Drawing Sheets

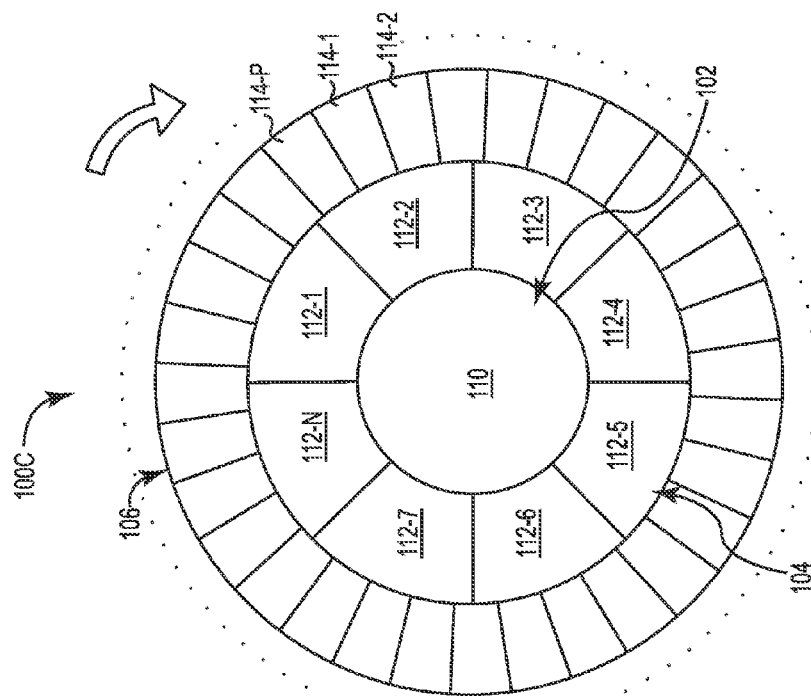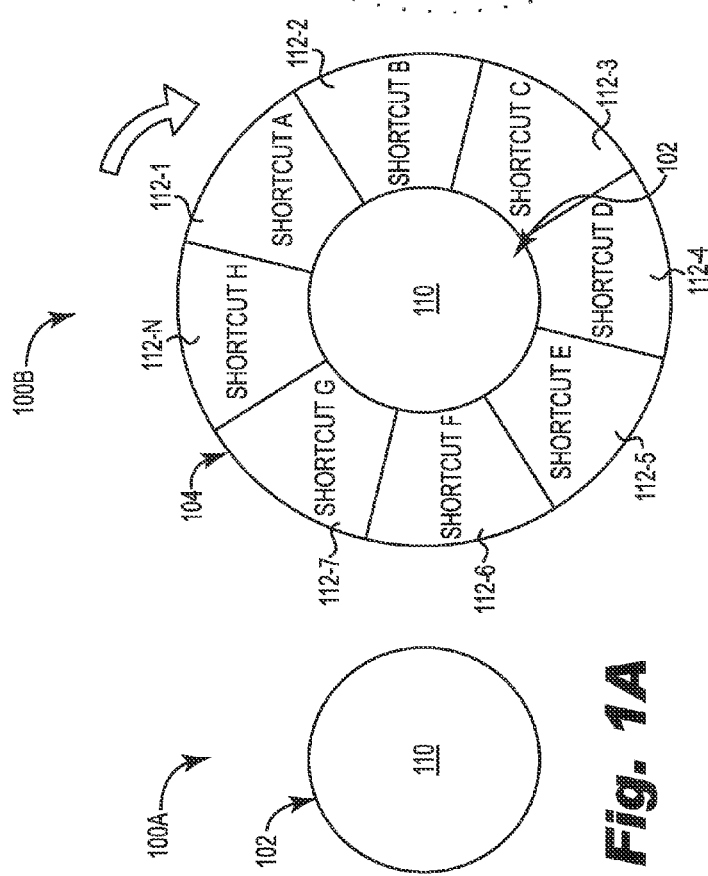

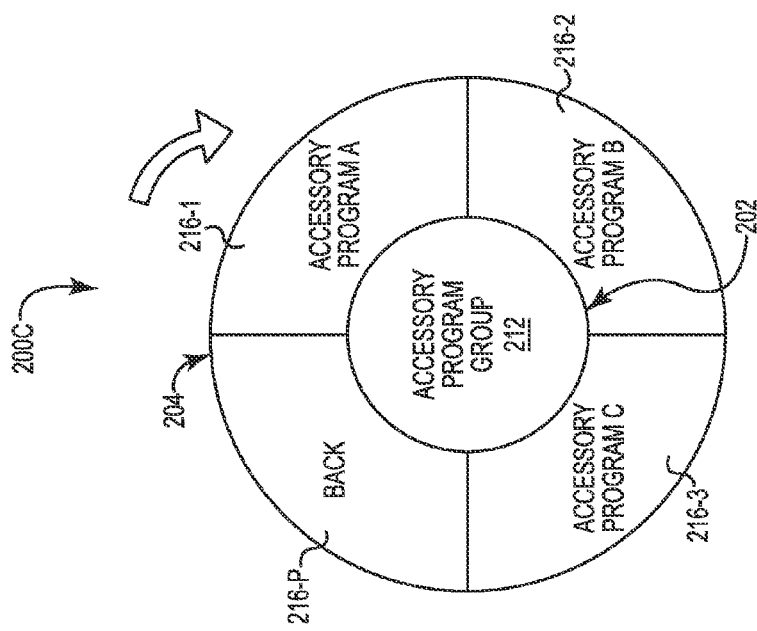
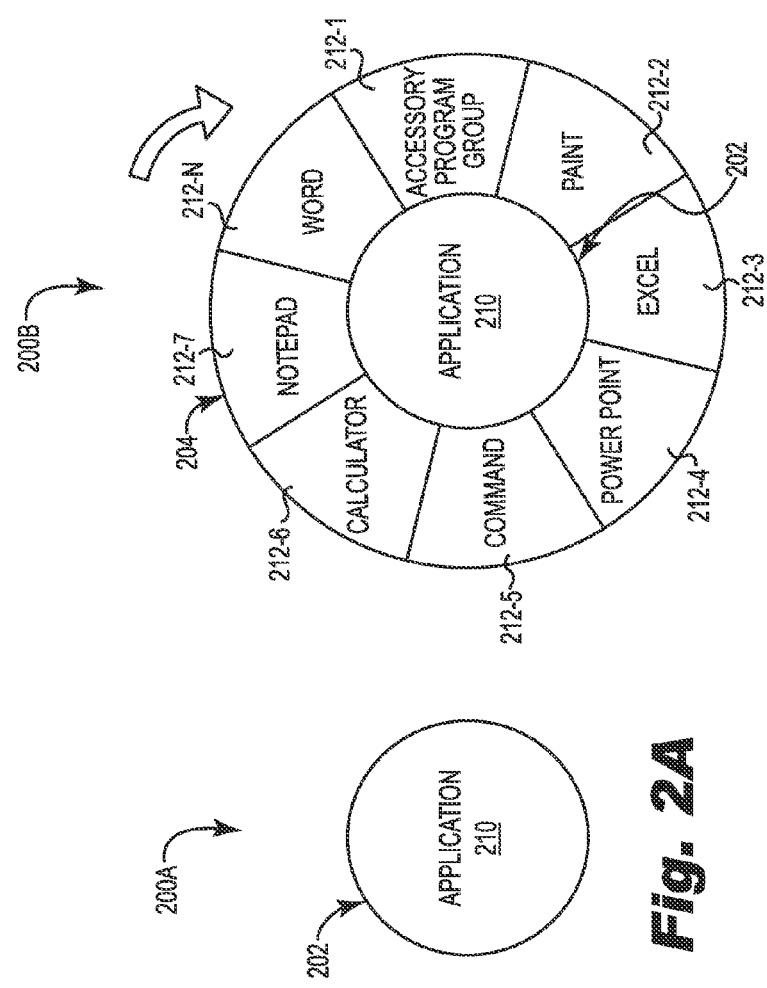

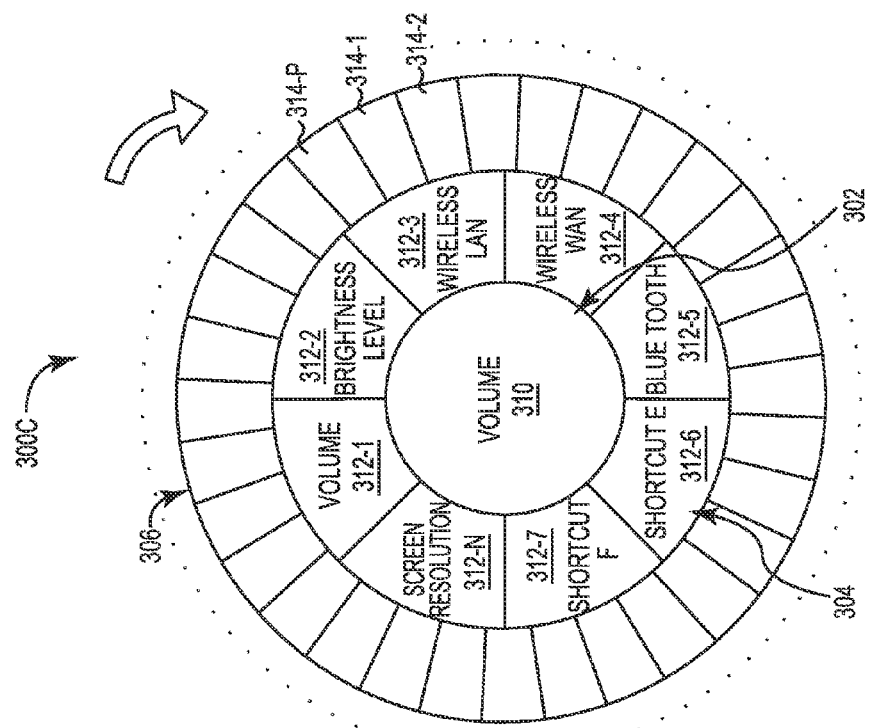
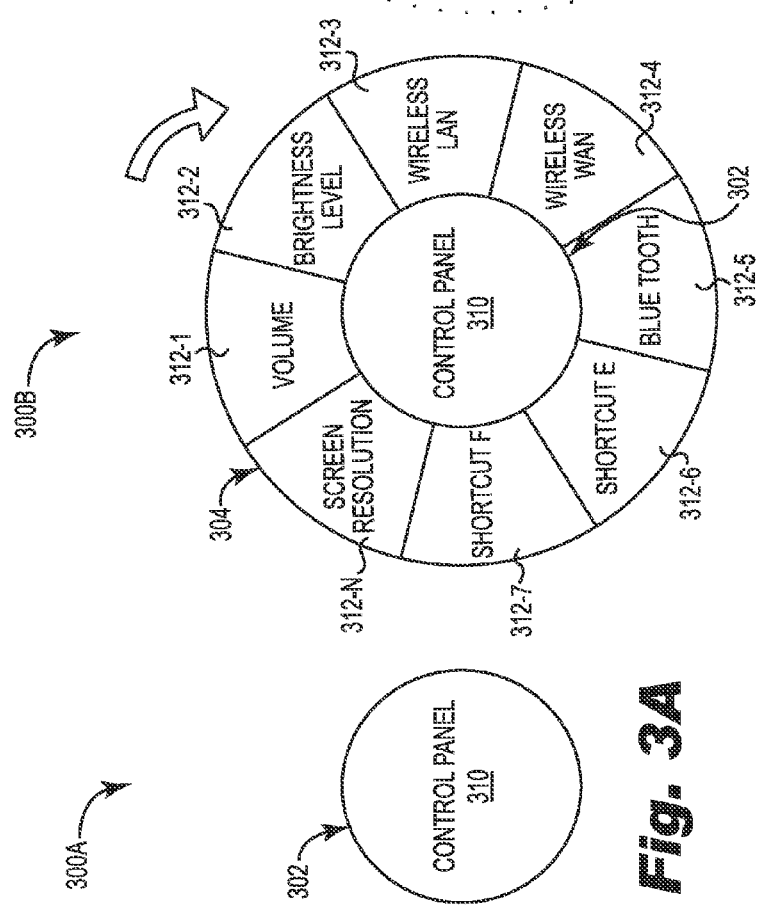
Fig. 3A
Fig. 3B
Fig. 3C

RADIAL GRAPHICAL USER INTERFACE

BACKGROUND

Some computer applications implicate a continuously increasing number of functions for the user. Users can interact with applications through the use of graphical user interfaces, or GUI's. GUI's allow a user to interact with the application on a computing device with images and/or text. A GUI can display an application's menu system. Traditionally, menu systems may be arranged and displayed in a drop-down menu which can be several levels deep. Each level of the menu system may be displayed as a separate drop-down menu in a rectangular box that is visually connected to the previous level.

BRIEF DESCRIPTIONS OF THE DRAWINGS

FIGS. 1A-1C are diagrams that illustrate example graphical user interfaces according to the present disclosure.

FIGS. 2A-2C are diagrams that illustrate example graphical user interfaces with two radial menu layers according to the present disclosure.

FIGS. 3A-3C are diagrams that illustrate example graphical user interfaces with three radial menu layers according to the present disclosure.

DETAILED DESCRIPTION

Figure 4:
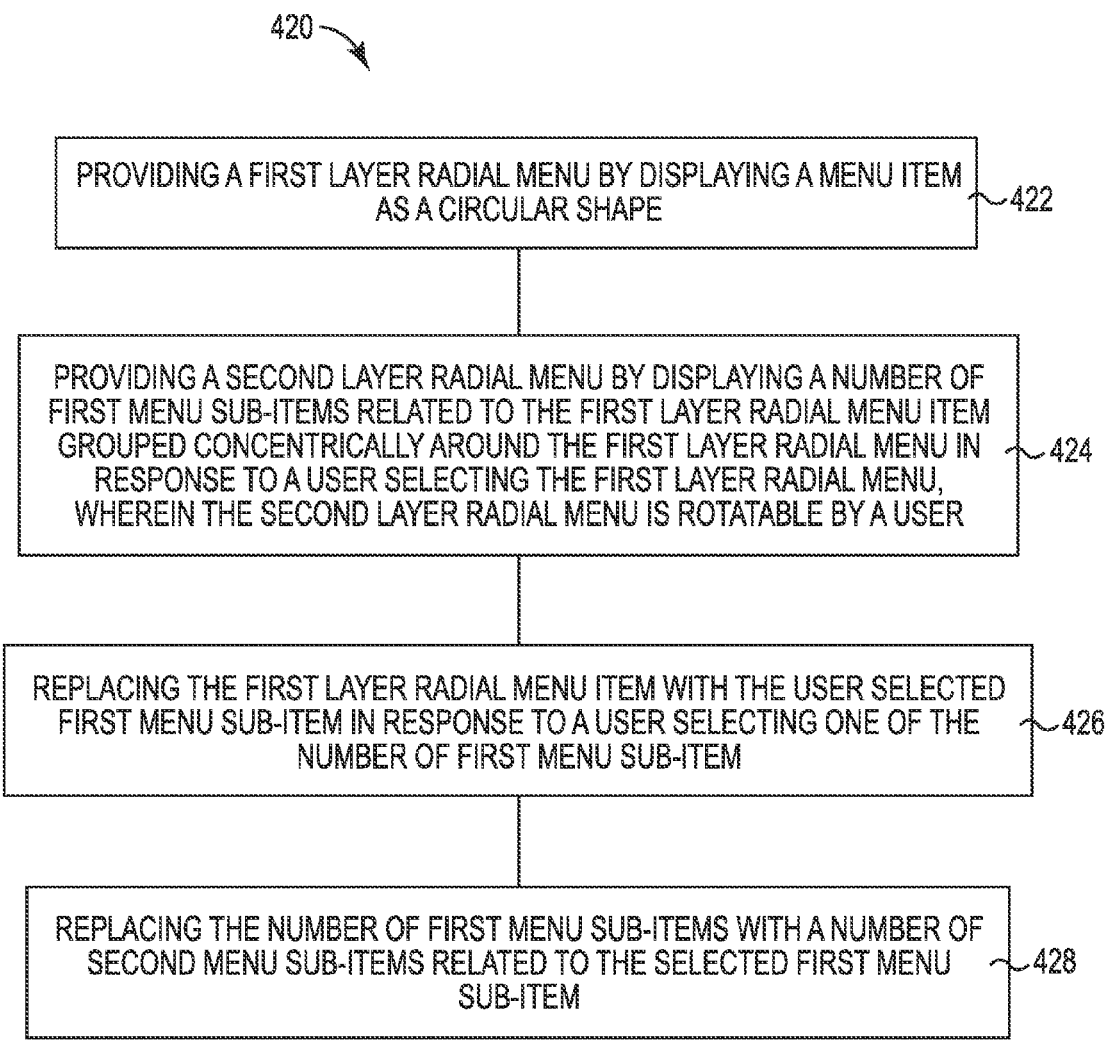
FIG. 4 is a flow chart illustrating an example method for providing a graphical user interface on a computing device display according to the present disclosure.

Examples of the present disclosure may include methods, systems, and machine-readable and executable instructions and/or logic. An example method for providing a radial graphical user interface may include displaying a first layer radial menu item as a circular shape and displaying a second layer radial menu of a number of first menu sub-items related to the first layer menu item grouped concentrically around the first layer radial menu. An example for providing a graphical user interface may also include replacing the first layer radial menu with a user selected first menu sub-item and replacing the second layer radial menu with a number of second menu sub-items related to the selected first menu sub-item, wherein the second layer is rotatable by a user.

Graphical user interfaces (GUI) allow users to interact with applications through images and/or text. Many applications have a menu of the application's functions which a user can view and interact with through a GUI. An application menu may have many menu items. For each menu item there may be multiple menu sub-items in the next level and each sub-item may have multiple menu sub-items in the respective next level, whereby a menu structure may be many levels deep. Traditionally, menu systems may be arranged and displayed in a drop-down menu which can be several levels deep. Each level of the menu may be displayed as a separate drop-down menu in a rectangular box that is visually connected to the previous level. However, the GUI of a drop-down menu system may result in the screen area being occupied by the application menu when a user is choosing a function for the application to perform and the application has many functions. Furthermore, the number of items displayed in the menus can be limited by the screen space.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and the process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1A, and a similar element may be referenced as 210 in FIG. 2B. As will be appreciated, elements shown in the various examples herein can be added, exchanged, and/or eliminated so as to provide a number of additional examples of the present disclosure. In addition, as will be appreciated, the proportion and the relative scale of the elements provided in the figures are intended to illustrate the examples of the present disclosure, and should not be taken in a limiting sense. As used herein, the designators "N", "P," and "Q" particularly with respect to reference numerals in the drawings, indicates that a number of the particular feature so designated can be included with a number of examples of the present disclosure.

FIGS. 1A-1C are diagrams that illustrate example graphical user interfaces (GUI) according to the present disclosure. Executable instructions associated with a processor may be used to display the GUIs 100A-C. The GUI 100A includes a first layer radial menu 102 displayed as a circular shape. A radial menu can include a number of menu items. For example, the first layer radial menu 102 includes one menu item 110, which can be an application launch menu among others. When a user selects the menu item 110 in the first layer radial menu 102, the GUI 100B is displayed including a second layer radial menu 104 concentrically grouped around the first layer radial menu 102 on the GUI 100B. The second layer radial menu 104 includes a plurality of first menu sub-items 112-1, 112-2 . . . 112-N related to the menu item 110. For example, each of the first menu sub-items 112-1, 112-2 . . . 112-N can be a short-cut to a respective functionality of menu-item 110 in the first layer radial menu 102.

The second layer radial menu 104 of first menu sub-items 112-1, 112-2 . . . 112-N is rotatable by a user. The rotation of the second layer radial menu 104 allows a user to rotate the second layer radial menu 104 so the number of first menu sub-items 112-1, 112-2 . . . 112-N are viewable on the computing device screen area. For example, the GUI 100B may be positioned on a screen display area of a computing device so that some first menu sub-items 112-1 and 112-2 are visible but other first menu sub-items 112-3, 112-4 . . . 112-N are not visible. Rotation of the second layer radial menu 104 allows a user to view the desired first menu sub-items 112-1, 112-2 . . . 112-N in the second layer radial menu 104, while having the GUI 100B located in a position on the computing device screen area that is convenient.

When a user selects a first menu sub-item 112-1 out of the number of first menu sub-items 112-1, 112-2 . . . 112-N, the GUI 100C is displayed including a third layer radial menu 106 concentrically grouped around the second layer radial menu 104. The third layer radial menu 104 includes a plurality of second menu sub-items 114-1, 114-2 . . . 114-P of the selected first menu sub-item 112-1. The second menu sub-items 114-1, 114-2 . . . 114-P can be a number of values of the selected first menu sub-item 112-1. For example, the second menu sub-items 114-1, 114-2 . . . 114-P can be a number of values corresponding to a function of the selected first menu sub-item 112-1, such as volume level or contrast level. The third layer radial menu 106 is rotatable by a user. Rotation of the third layer radial menu 106 by a user can change the value of selected first menu sub-item 112-1. As a user rotates the third layer radial menu 106, the selected first menu sub-item 112-1 is changed to the corresponding value of the second menu sub-items 114-1, 114-2 . . . 114-P. The user is able to change the value of the selected first menu sub-item 112-1 without clicking a menu item by rotating the third layer radial menu 106 with an input device.

In various examples of the present disclosure, the GUIs 100A-C are displayed on a computing device display area such that the entire circular menu 100A-C comprises a smaller area than the computing device display area. For example, the entire circular menu of the GUI 100C is displayed such that the first layer radial menu 102, the second layer radial menu 104, and the third radial menu 106 are readable, functional, and selectable by a user with an input device on the computing device display area.

Further, in various examples of the present disclosure, the entire circular menu of the GUI 100A, 100B, and 100C are movable and resizable by a user. In response to an input from a user, the entire circular menu of the GUIs 100A-C can be displayed at a different location than the entire circular menu 100A-C was first located at. And, in response to an input from a user, the entire circular menu of the GUIs 100A-C can be resized to be smaller or larger. Examples of inputs from a user include selecting the GUI 100A-C with a mouse and dragging (eg., selecting the first layer radial menu 110 of the GUIs 100A-C with a mouse and dragging), keyboard strokes, a number of finger movements on a touch sensitive screen (eg., a user touching the first layer radial menu 110 of the GUIs 100A-C with a finger and moving the finger), and striking a button located on the computing device, among others.

FIGS. 2A-2C are diagrams that illustrate example GUIs with two radial menu layers according to the present disclosure. Executable instructions associated with a processor may be used to display the GUIs 2A-C. The GUI 200A includes a first layer radial menu 202 displayed as a circular shape. A radial menu can include a number of menu items. For example, the first layer radial menu 202 can include a first menu item 210, which can be an application launch menu, among other things. When a user selects menu item 210, the GUI 200B is displayed including a second layer radial menu 204 concentrically grouped around the first layer radial menu 202. The second layer radial menu includes a plurality of first menu sub-items 212-1, 212-2 . . . 212-N related to the first layer radial menu item 210, which can be shortcuts to applications. When a user selects one of the number of first menu sub-items 212-1, 212-2 . . . 212-N, the GUI 200C is displayed. The GUI 200C is a two layer radial menu. In response to a user selecting a first menu sub-item 212-1, the GUI 200C displays the selected first menu sub-item 212-1 in the first layer radial menu 202. Thereby, the menu item 210 in the first layer radial menu layer 202 of the GUI 200B is replaced by the selected first menu sub-item 212 in the first radial menu layer 202 of the GUI 200C. Further, the GUI 2000 replaces the number of first menu sub-items 212-1, 212-2 . . . 212-N located in the second layer radial menu 204 of the GUI 200B with a plurality of second menu sub-items 216-1, 216-2 . . . 216-P related to the selected first menu sub-item 212 in the second layer radial menu 204 of the GUI 200C. The plurality of second menu sub-items 216-1, 216-2 . . . 216-P can be applications related to the selected first menu sub-item 212 or values of a function of the selected first menu sub-item 212.

In various examples of the present disclosure, in response to a user selecting one of the number of second menu sub-items 216-1, 216-2 . . . 216-P an application is launched. For example, if a user selects second menu sub-item Accessory Program A 216-1, Accessory Program A will launch. As a user selects a second menu sub-item 216-1 and an application is launched (eg., Accessory Program A), the GUI 200C disappears from the user screen. The GUI 200C is in an idle state and, therefore, is not visible on the computing device display screen when an application is launched. If a user selects second menu sub-item Back 216-P, the GUI 200C will replace the first layer radial menu item 212 with the first layer radial menu item 210 from the previous GUI 200B. The GUI 200C will further replace the second layer radial menu 204 of a number of second menu sub-items 216-1, 216-2 . . . 216-P with the number of first menu sub-items 212-1, 212-2 . . . 212-N from the previous GUI 2008. Thereby, in response to a user selecting Back 216-P, the GUI 200C will transform back into the previous GUI 200B.

The second layer radial menus of the GUIs 200B and 200C are rotatable by an input of the user. An input can include scrolling up and down on a mouse, rotating the GUIs 200B-C with a mouse by dragging the mouse, scrolling on a keyboard, and rotating the GUIs 200B-C on a touch sensitive screen by a user with a finger, among others. Rotation of the second layer radial menus 204 of the GUIs 20013-C can allow a user to position the GUIs 200B-C such that the GUIs 200B-C are in a convenient location. For example, the GUIs 200B-C could be displayed partially off the computing device display screen for convenience. By rotating the second layer radial menus 204 of GUIs 200B-C, a user can view the desired first menu sub-items 212-1, 212-2 . . . 212-N or second menu sub-items 216-1, 216-2 . . . 216-P while keeping the entire circular menu of the GUIs 200B-C partially off screen.

In various examples of the present disclosure, the second menu sub-items 216-1, 216-2 . . . 216-P of the GUI 200C can include values corresponding to the selected first menu sub-item 212. Values corresponding to the selected first menu sub-item 212 can include items such as volume level values and brightness level values, among others. When a user rotates the second layer radial menu 204 of the number of values 216-1, 216-2 . . . 216-P corresponding to the selected first menu sub-item 212, the value of the selected first menu sub-item 212 changes. For example, if the selected first menu sub-item 212 is Volume, the second menu sub-items 216-1, 216-2 . . . 216-P will be numbers relating to the value or level of volume of the computing device or specified application. Rotating the second layer radial menu 204 in the GUI 200C will cause the volume to increase or decrease.

Further, in various examples of the present disclosure, the entire circular menus of the GUIs 200A-C are movable by an input by the user. For example, in response to an input from a user, the entire circular menu of the GUI 200C can be displayed at a different location then the entire circular menu of the GUI 200C was first located at. Examples of inputs from a user include selecting the first layer radial menu 210/212 of the GUI 200A-C with a mouse and dragging, keyboard strokes, a number of finger movements on a touch sensitive screen (eg., a user touching the first layer radial menu 210/212 of the GUI 200A-C with a finger and moving the finger), and striking a button located on the computing device, among others.

FIGS. 3A-3C are diagrams that illustrate example GUIs with three radial menu layers according to the present disclosure. Executable instructions associated with a processor may be used to display the GUIs 300A-C. The GUI 300A includes a first layer radial menu 302. The first layer radial menu 302 is populated with one menu item 310, which can be an application launch menu, for example. The first layer radial menu 302 is displayed as a single circular shape on the GUI 300A. In response to user selection of the first layer radial menu 302, the GUI 300B is populated and displayed. The GUI 300B includes the first layer radial menu 302 and a second layer radial menu 304. The second layer radial menu 304 is populated with a number of first menu sub-items 312-1, 312-1 . . . 312-N and displayed concentrically grouped around the first layer radial menu 304 on the GUI 300B. The number of first menu sub-items 312-1, 312-2 . . . 312-N can be menu sub-items of the first layer radial menu item 310, which can be shortcuts to applications, for example. The number of first menu sub-items 312-1, 312-2 . . . 312-N are displayed as a number of annular sections which form an annulus around the first layer radial menu 302.

In response to user selection of one of the number of first menu sub-items 312-1, 312-2 . . . 312-N, the GUI 300C is populated and displayed. The GUI 300C includes the first layer radial menu 302, a second layer radial menu 304, and a third layer radial menu 306. The third layer radial menu 306 is populated with a plurality of second menu sub-items 314-1, 314-2 . . . 314-P and displayed concentrically grouped around the second layer radial menu 304. The number of second menu sub-items 314-1, 314-2 . . . 314-P can be a number of values of a function of the selected first menu sub-item 312-1. The number of second menu sub-items 314-1, 314-2 . . . 314-P are displayed as a number of annular sections which form an annulus around the second layer radial menu 304.

The third layer radial menu 306 is rotatable by a user. A user can rotate the third layer radial menu 306 by an input which can include a mouse scroll, scrolling on a keyboard, rotating the third layer radial menu 306 with a mouse by dragging the mouse, and using a finger to rotate the third layer radial menu 306 on a touch sensitive screen, among other input devices or input sources. In response to user rotation of the third layer radial menu 306, the function value corresponding to the selected first menu sub-item 312-1 is performed. For example, in the GUI 300C with a selected first menu sub-item 312-1 of Volume, when a user rotates the third layer radial menu 306, the volume of the device, application, or program is increased or decreased depending on the direction that the user rotates the third layer radial menu 306.

In various examples of the present disclosure, the entire circular menus of the GUIs 300A-C are movable by an input by the user. For example, in response to an input from a user, the entire circular menu of the GUI 300C can be displayed at a different location then the entire circular menu of the GUI 300C was first located at. Examples of inputs from a user include selecting the first layer radial menu 310 of the GUIs 300A-C with a mouse and dragging, keyboard strokes, a number of finger movements on a touch sensitive screen (eg., a user touching the first layer radial menu 310 of the GUIs 300A-C with a finger and moving the finger), and striking a button located on the computing device, among others.

Further, in various examples of the present disclosure, in response to user selection of one of the number of second layer radial menu sub-item 312-1, 312-2 . . . 312-N, the GUI 300C displays the selected second layer radial menu sub-item 312-1 in the first layer radial menu 302. And further, the GUI 300C can display the second sub-item 314-1, 314-2 . . . 314-P as rotated by a user in the first layer radial menu 302.

FIG. 4 is a flow chart illustrating an example method for providing a GUI on a computing device display according to the present disclosure. The method 420 can provide a two layer radial GUI that is rotatable by a user. For example, a menu can be displayed as a circular shape with two layers of radial menus through method 420.

At 422, a first layer radial menu is provided on a GUI. The first layer radial menu is displayed as a circular shape. A radial menu can include a number of menu items. Examples of first layer radial menu items displayed at 422 include control panel and application launch menu, among others.

At 424, a second layer radial menu is provided in response to a user selecting the first layer radial menu. The second layer radial menu is displaying a number of first menu sub-items grouped concentrically around the first layer radial menu. The number of first menu sub-items relate to the first layer radial menu item. Examples of first menu sub-items include applications such as calculator, command, and volume, among others. Further, the second layer radial menu is rotatable by a user. Rotation of the second layer radial menu of a number of first menu sub-items allows a user to rotate the second layer radial menu so the number of first menu sub-items are viewable on the computing device screen area. For example, if the GUI is partially out of the screen area, a user can rotate the second layer radial menu to view hidden first menu sub-items located in the second layer radial menu. The first menu sub-items which were previously hidden off screen are rotated by the user to a viewable position.

At 426, in response to a user selecting one of the number of first menu sub-items from the second layer radial menu, the first layer radial menu item is replaced by the user selected first menu sub-item. For example, a second layer includes sub-items Calculator, Command, and Accessory Program Group. At 426, after a user selects Calculator, Calculator will replace and be displayed in the first layer radial menu.

At 428, in response to a user selecting a first menu sub-item, the number of first menu sub-items are replaced by a number of second menu sub-items related to the selected first menu sub-item. The second layer radial menu is rotatable by a user. The number of second menu sub-items may include applications of the selected first menu sub-item. When a user selects a second menu sub-item, the application may launch. In response to the application launching, the radial GUI disappears from the computing device display screen; the GUI is in an idle state when an application is launched.

In various examples of the present disclosure, the number of second menu sub-items may also include values corresponding to the selected first menu sub-item. When a user rotates the second layer radial menu of a number of values corresponding to the selected first menu sub-item, the value of the selected first menu sub-item changes. A user is thereby able to increase and decrease the value of the selected first menu sub-item by rotation of the second layer radial menu without clicking the menu item.

Figure 5:
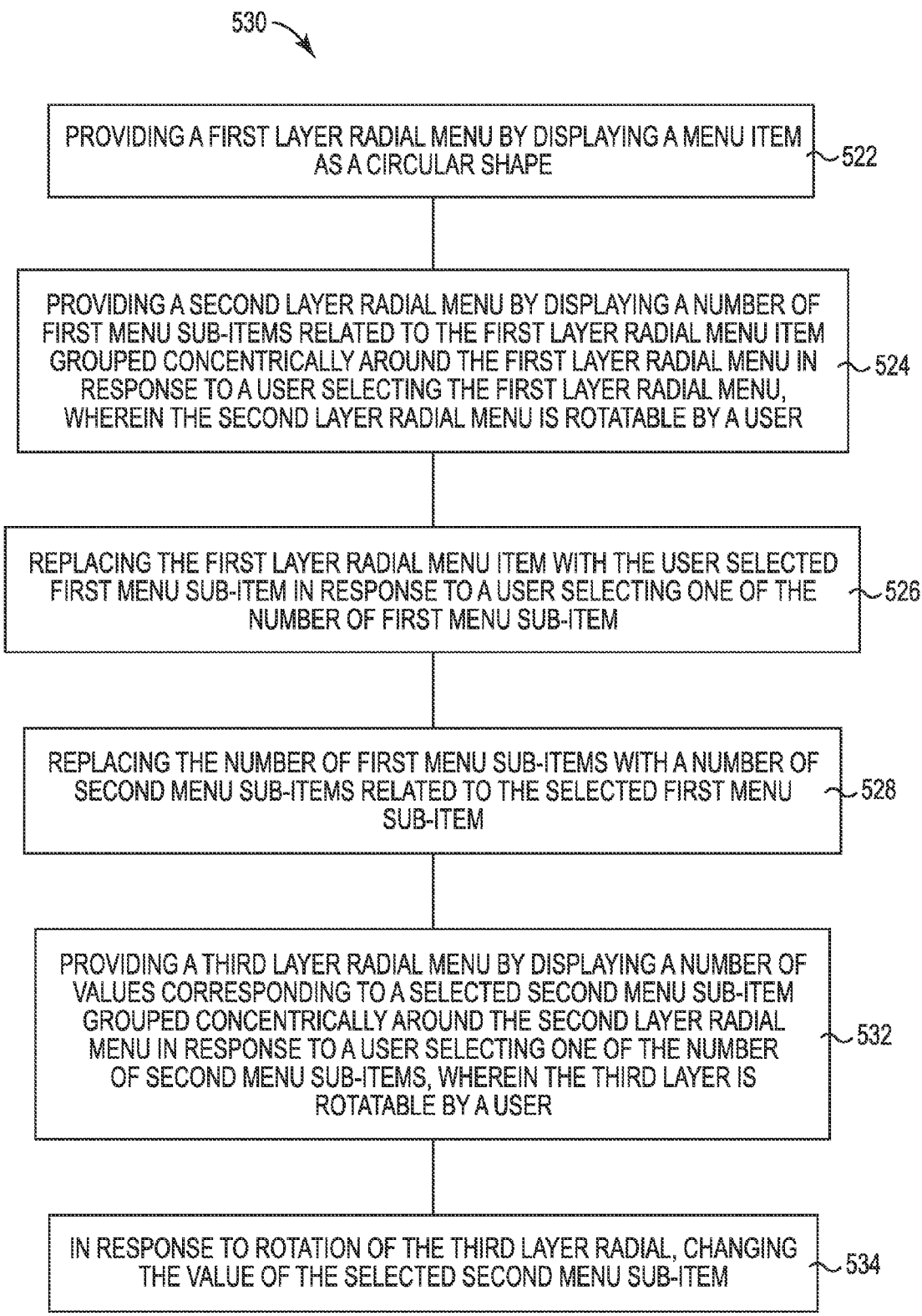
FIG. 5 is a flow chart illustrating an example method of providing a graphical user interface with three radial menu layers according to the present disclosure.

FIG. 5 is a flow chart illustrating an example method of providing a GUI with three radial menu layers according to the present disclosure. The method 530 can provide a three layer radial GUI that is rotatable by a user.

At 522, a first layer radial menu is provided by displaying a menu item as a circular shape. A radial menu can include a number of menu items. At 524, a second layer radial menu is displayed in response to a user selecting the first layer radial menu item. The second layer radial menu is a number of first menu sub-items related to the first layer radial menu item that are concentrically grouped around the first layer radial menu and is rotatable by a user. At 526, the first layer radial menu item is replaced with a user selected first menu sub-item in response to a user selecting a first menu sub-item. At 528, the second layer radial menu is replaced with a number of second menu sub-items related to the selected first menu sub-item and is rotatable by a user.

At 532, a third layer radial menu is provided in response to a user selecting one of the number of second menu sub-items. The third layer radial menu includes a number of values corresponding to the selected second menu sub-item that are grouped concentrically around the second layer radial menu and is rotatable by a user.

At 534, in response to rotation of the third layer radial menu of values of the selected second menu sub-item, the value of the selected second menu sub-item is changed. For example, in response to a user rotating the third layer, a value is decreased or increased in response to the rotation.

In various examples of the present disclosure, the GUI can further include providing and displaying the first and second layer radial menus concurrently in response to a first input from a user. Prior to the first input by a user, the first and second layer radial menus remain hidden on a screen display area of a computing device in an idle state. A first input from a user may include a double click on a mouse, finger movement on a touch sensitive screen, or taping the desktop, among others. The idle state allows for undisrupted screen display area of the computing device. Further, the concurrent display of the first and second layer radial menus allows for efficient and simplified user location of the GUI.

Figure 6:
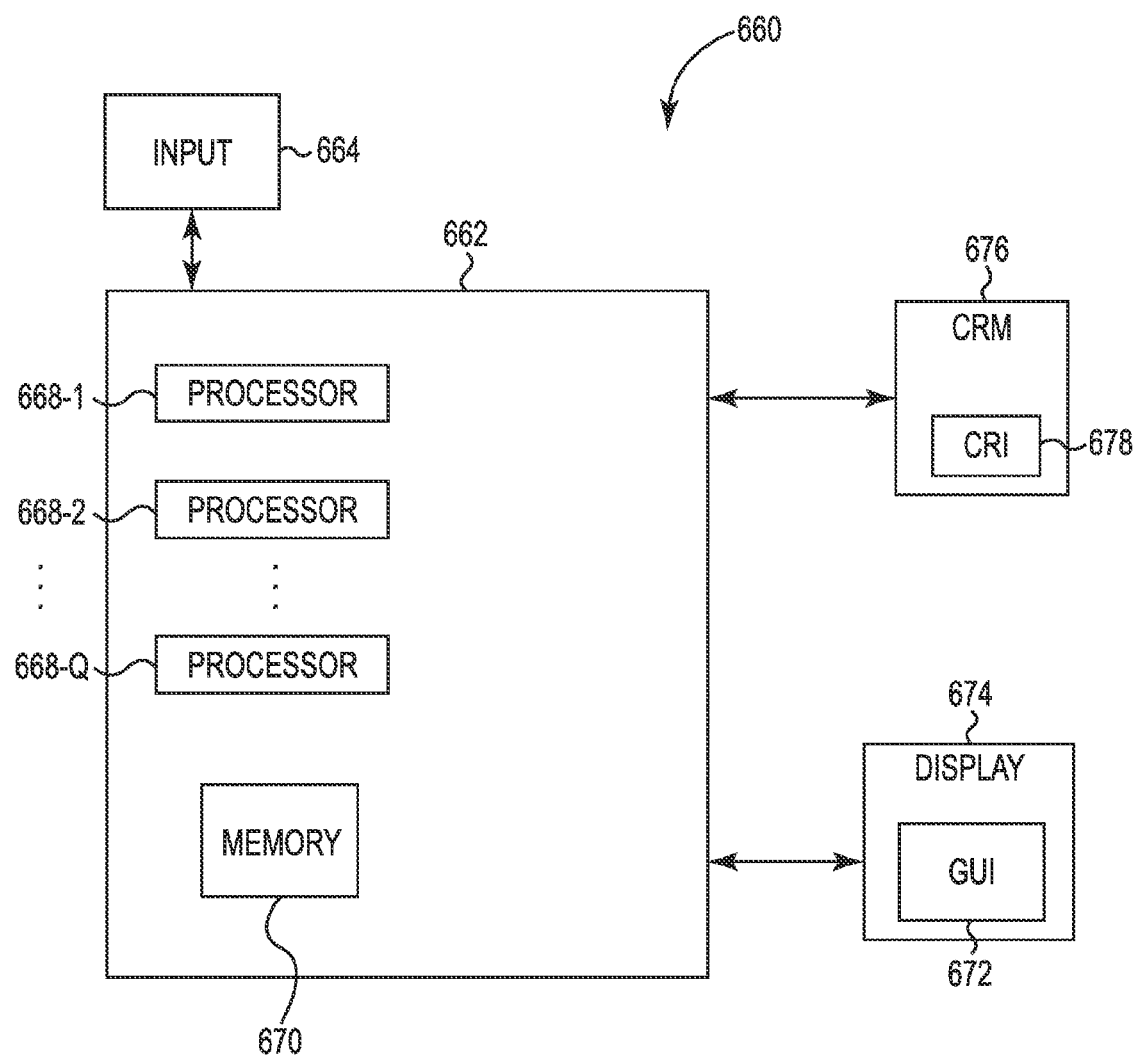
FIG. 6 is a block diagram of an example of a computer-readable medium in communication with processing resources to provide a radial graphical user interface according to the present disclosure.

FIG. 6 is a block diagram of an example of a computer-readable medium (CRM) 676 in communication with processing resources 668-1, 668-2 . . . 668-Q to provide a radial GUI according to the present disclosure. CRM 676 can be in communication with a computing device 662. The computing device 662 can be in communication with, and/or receive a tangible non-transitory CRM 676 storing a set of compute readable instructions 678 executable by one or more of the processor resources 668-1, 668-2 . . . 668-Q, as described herein. The computing device 662 may include a memory resources 670, and the processor resources 668-1, 668-2 . . . 668-Q may be coupled to the memory resources 670.

Processor resources 668-1, 668-2 . . . 668-Q can execute computer-readable instructions 678 that are stored on an internal or external non-transitory CRM 676. A non-transitory CRM (e.g., CRM 676), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), magnetic memory such as a hard disk, tape drives, floppy disk, and/or tape memory, optical discs, digital versatile discs (DVD), flash, ect., as well as other types of machine-readable media.

The non-transitory CRM 676 can be integral, or communicatively coupled, to a computing device, in either a wired or wireless manner. For example, the non-transitory CRM 676 can be an internal memory of computing device 662, a portable memory, a portable disk, or a memory associated with another computing resource (e.g., enabling the computer-readable instructions to be transferred and/or executed across a network such as the Internet.)

The CRM 676 can be in communication with the processor resources 668-1, 668-2 . . . 668-Q via a communication path. The communication path can be local or remote to a computing device (e.g. computing device 662) associated with the processor resources 668-1, 668-2 . . . 668-Q. Examples of a local communication path can include an electronic bus internal to a machine such as a computer where the CRM 676 is one of volatile, non-volatile, fixed, and/or removable storage medium in communication with the processor resources 668-1, 668-2 . . . 668-Q via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path can be such that the CRM 676 is remote from the processor resources (e.g., 668-1, 668-2 . . . 668-Q) such as in the example of a network connection between the CRM 676 and the processor resources (e.g., 668-1, 668-2 . . . 668-Q). That is, the communication path can be a network connection. Examples of such a network connection can include a local area network (LAN), a wide area network (WAN), a personal area network (PAN), and the Internet, among others. In such examples, the CRM 676 may be associated with a first computing device and the processor resources 668-1, 668-2 . . . 668-Q may be associated with a second computing device 662.

The processor resources 668-1, 668-2 . . . 668-Q coupled to the memory 670 can provide a radial GUI. The processor resources 668-1, 668-2 . . . 668-Q coupled to the memory 670 can populate and display a first layer radial menu with a menu item shaped as a circular shape on a GUI 672. In response to user selection of the first layer radial menu with an input device 664, the processor resources 668-1, 668-2 . . . 668-Q coupled to the memory 670 can populate and display a second layer radial menu of menu sub-items related to the first layer menu item concentrically grouped around the first layer radial menu on the GUI 672; wherein, the processor resources 668-1, 668-2 . . . 668-Q display the second layer radial menu as a number of annular sections forming an annulus around the first layer radial menu. In response to user selection of the second layer radial menu sub-item with an input device 664, the processor resources 668-1, 668-2 . . . 668-Q coupled to the memory 670 can populate and display a third layer radial menu of a group of values of a function of the selected second layer radial menu sub-item concentrically grouped around the second layer radial menu on the GUI 672; wherein, the processor resources 668-1, 668-2 . . . 668-Q display the third layer radial menu as a number of annular sections forming an annulus around the second layer radial menu. In response to user rotation of the third layer radial menu with an input device 664, the processor resources 668-1, 668-2 . . . 668-Q coupled to the memory 670 can perform the corresponding third layer radial menu function value for the selected second layer menu sub-item. The GUIs 672 are displayed on a computing device display screen area 674 by the processor resources 668-1, 668-2 . . . 668-Q.

In various examples of the present disclosure, the processor resources 668-1, 668-2 . . . 668-Q coupled to the memory 670 can display on the user interface 672 the third layer radial menu function value, as rotated by a user, in the first layer radial menu.

The input device 664 and computing device display screen 674 can both be separate or internal devices of the computing device 662. Input device 664 can include a hardware device. Examples of hardware devices are keyboards, mouse, and a button located on the computing device 662, among other hardware devices. The input device 664 and computing device display screen 674 can further be the same internal or separate device, such as a touch sensitive screen. For example, with a touch sensitive screen, a user is able to make inputs and view the GUI on the same device 664, 674. Input device 664 allows for a user to select the first and second layer radial menus and allows a user to rotate the second and third layer radial menus. Input device 664 further allows for user inputs as described in various examples of the present disclosure.

The above specification, examples, and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed is:

1. A method for providing a radial graphical user interface on a computing device display comprising:
   providing a first layer radial menu by displaying a menu item as a circular shape;
   providing a second layer radial menu by displaying a number of first menu sub-items related to the first layer radial menu item grouped concentrically around the first layer radial menu in response to a user selecting the first layer radial menu, wherein the second layer radial menu is rotatable by a user;
   replacing the first layer radial menu item with the user selected first menu sub-item in response to a user selecting one of the number of first menu sub-items, wherein replacing the first layer radial menu item includes populating the first layer radial menu with the user selected first menu sub-item;
   replacing the number of first menu sub-items with a number of second menu sub-items related to the selected first menu sub-item, wherein the number of second menu sub-items include a number of values of a function of the selected first menu sub-item;
   performing a value of the function of the selected first menu sub-item, in response to a user rotating the second layer radial menu.

2. The method of claim 1, wherein the method further includes launching an application in response to the user selecting one of the number of second menu sub-items related to the selected first menu sub-item.

3. The method of claim 1, wherein providing the first and second layer radial menus further includes:
   concurrently providing the first and second layer radial menus in response to an input from a user.

4. The method of claim 1, wherein the method further includes:
   providing a third layer radial menu by displaying a number of values corresponding to a function of a selected second menu sub-item grouped concentrically around the second layer radial menu in response to a user selecting one of the number of second menu sub-items, wherein the third layer is rotatable by a user; and
   in response to rotation of the third layer radial menu, changing a value of the function of the selected second menu sub-item.

5. A non-transitory computer-readable medium storing a set of instructions executable by a processor to cause a computing device to:
   display a first layer radial application launch menu on a graphical user interface as a circular shape;
   in response to a selection of the application launch by a user, display a second layer radial menu concentrically around the first layer on the graphical user interface, wherein the second layer radial menu includes a number of menu sub-items related to the first layer application launch menu;
   in response to a selection of a second layer menu sub-item by a user, display a third layer radial menu concentrically around the second layer radial menu on the graphical user interface, wherein the third layer radial menu includes a number of values of a function of the selected second layer menu sub-item; and
   in response to a user rotating the third layer radial menu, perform a value among the number of values of the function of the selected second layer menu sub-item.

6. The non-transitory computer-readable medium of claim 5, wherein the instructions are executable to rotate the third layer radial menu of a number of values of the selected second layer menu sub-item in response to an input by a user.

7. The non-transitory computer-readable medium of claim 6, wherein the instructions executable to perform the value includes instructions to change a physical value of the function of the selected second layer menu sub-item in response to the user rotating the third layer radial menu of values.

8. The non-transitory computer-readable medium of claim 5, wherein the instructions are executable to display the selected second layer menu sub-item in the first layer radial menu in response to a user selecting the second layer menu sub-item.

9. The non-transitory computer-readable medium of claim 5, wherein the instructions are executable to:
   concurrently display the first layer radial application launch menu and the second layer radial menu in response to a first input from a user;
   display the first, second, and third layer radial menus wherein an entire circular menu comprises a smaller area than the computing device display area;
   display the entire circular menu at a different location on the computing device display area in response to a second input from a user; and
   resize the entire circular menu in response to a third input from a user.

10. A system for providing a radial graphical user interface comprising:
    a processor;
    a memory coupled to the processor and configured to direct the processor to:
      populate a first layer radial menu with a menu item;
      display the populated first layer radial menu as a single circular shape on a user interface;
      in response to user selection of the first layer radial menu, populate a second layer radial menu with menu sub-items of the first layer menu item;
      display the populated second layer radial menu concentrically grouped around the first layer radial menu on the user interface, wherein the second layer is a number of annular sections forming an annulus;
      in response to user selection of a second layer radial menu sub-item, populate a third layer radial menu with a group of values of a function of the selected second layer menu sub-item; and
      display the populated third layer radial menu concentrically grouped around the second layer radial menu on the user interface, wherein the third layer is a number of annular sections forming an annulus; and
      in response to a user rotating the third layer radial menu, perform a value among the group of values of the function of the selected second layer menu sub-item.

11. The system of claim 10, further comprising a touch sensitive screen for a user to select the first layer and second layer radial menu items and rotate the third layer radial menu.

12. The system of claim 10, further comprising a hardware device for a user to select the first layer and second layer radial menu items and rotate the third layer radial menu.

13. The system of claim 10, wherein the memory further directs the processor to display the performed value of the function as rotated by a user in the first layer radial menu.

* * * * *